Patented Sept. 22, 1942

2,296,249

UNITED STATES PATENT OFFICE 2,296,249

POLYMERS OF FORMALDEHYDE

Paul Rolland Austin and Charles Edward Frank, Wilmington, Del., assignors to E. I. du Pont de Nemours & Company, Wilmington, Del., a corporation of Delaware No Drawing. Application August 26, 1940, Serial No. 354,278

17 Claims. (Cl. 260—64)

This invention relates to organic polymeric materials and more particularly to moldable organic polymeric materials.

In general, when formaldehyde is polymerized under neutral, alkaline or acid conditions, relatively low molecular weight products are produced which are weak and unstable, and hence not suitable for molding purposes.

Although plastic formaldehyde polymers are known to the art, consistently high molecular weight products have been obtainable only with difficulty. Such polymers are brittle, tend to decompose rapidly at their melting points, and furthermore have poor flow characteristics at their molding temperatures. Consequently, they are not suitable for molding purposes.

This invention has as an object the preparation of new polymers of formaldehyde. Another object is the preparation of high molecular weight polymers of formaldehyde of reduced brittleness, little or no tendency to decompose at their melting points, and of good flow characteristics at molding temperatures. A still further object is the preparation of tough, unusually stable, polymers of formaldehyde. Other objects will appear hereinafter.

These objects are accomplished by the following invention wherein anhydrous monomeric formaldehyde is polymerized at −20 to +30° C. in an inert solvent, containing from 0.05 to 5.0 mole per cent (based on the formaldehyde used) of an aliphatic acyl ethenone and from 0.01 to 2.0 mole per cent (based on formaldehyde used) of an isocyanate.

The anhydrous formaldehyde suitable for the preparation of formaldehyde polymers may be prepared by a number of methods known to the art. It is conveniently obtained by depolymerizing the higher molecular weight formaldehyde polymers such as "alpha-polyoxymethylene," which is precipitated on adding alkali to an aqueous formaldehyde solution. These polymers are depolymerized by heat, the addition of certain catalysts being useful in reducing the temperature necessary. However, any method whereby anhydrous gaseous or liquid monomeric formaldehyde is obtained may be employed. Formaldehyde producing compounds such as trioxane may be decomposed and the resultant formaldehyde purified and utilized; for example, trioxane may be passed over a borophosphoric acid catalyst at about 170° C. to produce anhydrous formaldehyde gas.

Any solvent which is inert to the polymerizing reactants may be employed as the medium for the reaction. Such solvents include hydrocarbons, halogenated hydrocarbons, and ethers. Because of its inertness, low freezing point, and low boiling point methylene chloride is a particularly suitable solvent for the practice of this invention. The polymerization may be carried out in a wide variety of concentrations, but formaldehyde concentrations of 15–50 per cent are generally most suitable, the 25–35 per cent concentrations being preferred. At these concentrations the product is obtained as a powder or as a readily crushed porous solid. At higher concentrations the product is more compact and less readily removed from the reactor. At lower concentrations the polymer tends to be a less stable, lower molecular weight material.

Aliphatic acyl ethenones, including the aliphatic acyl alkyl ethenones, obtained by the action of tertiary amines on acyl chlorides are used as modifying agents for the formaldehyde polymer. Although octanoyl-n-hexylethenone obtainable by the action of trimethylamine upon n-octanoyl chloride is preferred, any aliphatic acylethenone, including any aliphatic acyl alkyl ethenone, may be used. These compounds are all capable of reacting with active methylol groups. The aliphatic acylethenones are preferably used in concentrations of 0.05 to 5.0 mole per cent of the formaldehyde. The exact amount of acylethenone used is of course dependent upon its molecular weight, 5–10 molecules of the acylethenone to each thousand formaldehyde molecules generally being most effective. With octanoyl-n-hexylethenone, 3–8 per cent by weight (approximately 0.3 to 1.0 mole per cent) of the formaldehyde may be employed although from 5–6 per cent by weight (approximately 0.6 to 0.8 mole per cent) is preferably used. Although the exact manner in which these modifying agents function is not known, it is believed that one or both of these modifying agents facilitate the formation of stable, high molecular weight formaldehyde polymers both by removing impurities and by reacting with the terminal methylol groups of the polymer. The isocyanate is used in relative small amounts, usually between 0.01–2.0 mole per cent of the formaldehyde employed. The exact amount of isocyanate is dependent upon its molecular weight, 2–4 isocyanate groups to each thousand formaldehyde molecules generally being most effective. With hexamethylene diisocyanate 0.3–1 per cent by weight (approximately 0.1 to 0.4 mole per cent of diisocyanate) of the formaldehyde is usually employed, although 0.5 to 0.8 per cent by weight (approximately 0.2 to 0.3 mole per cent of diisocyanate) is preferred.

In its preferred form the process of this invention is carried out as follows: Anhydrous formaldehyde is distilled under nitrogen or some other dry inert gas into a cooled pressure vessel containing a methylene chloride solution of hexamethylene diisocyanate and octanoyl-n-hexylethenone. However, the reactants and solvent may be added to the reaction vessel in any desired order, it being important simply that they be well mixed at a low temperature, usually $-80$ to $-20°$ C., before warming to the temperature of reaction.

Polymerization is carried out at pressures equal to or greater than the vapor pressure of formaldehyde at the temperature of the reaction. This may be accomplished either by sealing the vessel or by applying inert gas pressure (e. g., 25 pounds of nitrogen) to the system. The temperature is then raised to the $-20$ to $+30°$ C. range. Generally it is most desirable to hold the polymerization vessel at $0°$ to $+20°$ C. At these temperatures reaction is essentially complete after 24 hours. Stirring may be employed during the polymerization to assure a homogeneous product.

Upon completion of the reaction the solvent is removed from the product by filtration or by distillation. The polymer may then be used without further treatment. However, it is often desirable to remove unreacted formaldehyde and lower molecular weight products by washing with suitable solvents; these include organic solvents such as methyl alcohol, acetone, methylene chloride and benzene, as well as more active solvents such as dilute aqueous ammonia or aqueous formamide.

Any of a variety of suitable plasticizers may be incorporated into the polymer to increase flowability in the mold, and to improve the appearance and toughness of the resultant molding. Because of the limited compatibility of the polymers, plasticizers are best employed in relatively small amounts. It is preferred to use 5–10 per cent of ether-type plasticizers such as the dimethyl ether of tetraethylene glycol and dicresyl ether of diethylene glycol. However, numerous other types of material may be employed. Because of the insolubility of formaldehyde polymers, these plasticizers are best incorporated by digesting the finely divided polymer with a solution of the plasticizer in solvents having a swelling action on the polymer, mixtures of aromatic hydrocarbons and chloroform being particularly suitable. These solvents are then removed by evaporation or filtration, and the resultant plasticized polymer is molded.

Compounds such as phenols, amides, and casein which are good formaldehyde acceptors may be incorporated into the polymer by methods similar to that employed with the plasticizer, or by milling. These materials are useful for reaction with small amounts of formaldehyde liberated from the polymer during molding. These and other compounds are also useful for stabilizing the polymer by condensation with methylol end groups.

Various adjuvants such as fillers, pigments, and other polymers may be mixed and molded with the polymer to impart properties such as enhanced hardness, toughness, softness, flexibility, stability, color, etc. For certain cheap moldings the addition of fillers may also be employed to lower the cost of the product.

The more detailed practice of the invention is illustrated by the following examples, wherein parts given are by weight. There are of course many forms of the invention other than these specific embodiments.

*Example I*

Anhydrous formaldehyde (500 parts) is distilled into a cooled pressure vessel containing 1200 parts of methylene chloride, 25 parts of octanoyl-n-hexylethenone and 4 parts of hexamethylene diisocyanate. The distillation is carried out under an atmosphere of nitrogen, and the contents of the receiver are kept well mixed. The vessel is then sealed, 25 atmospheres of nitrogen applied, and the mixture allowed to warm to $0°$–$10°$ C. At this temperature the vessel is allowed to stand for 24 hours. The pressure is released and the solvent removed from the polymer by evaporation.

The resultant white polymer melts at 168–175° C. The product is essentially insoluble in all neutral solvents, for example, acetone, ethyl alcohol, benzene, chloroform, carbon tetrachloride, ethyl acetate, diethyl ether, and hydrocarbon solvents. It is readily molded in ordinary equipment at about 165–175° C. as follows:

Each of 4 portions (20 parts) of the polymer is mixed with 36 parts of benzene and 60 parts of chloroform; these solvents act as swelling agents. To three portions are added, respectively, (a) one part of β-phenoxyethanol, (b) one part of the dimethyl ether of tetraethylene glycol, (c) one part of tetraethylene glycol, and (d) one part of diphenyloloctadecane. After standing for several hours the benzene and chloroform are distilled from the mixtures, and the plasticized polymers are molded in a Carver press at 6000 pounds per square inch pressure and 165–175° C. Satisfactory moldings are obtained from all four portions.

*Example II*

Three hundred (300) parts of anhydrous formaldehyde is distilled into a cooled pressure vessel containing 800 parts of methylene chloride, 14 parts of octanoyl-n-hexylethenone and 3 parts of phenyl isocyanate; an atmosphere of nitrogen is maintained, and the contents of the receiver are kept well mixed during the distillation. The vessel is sealed and allowed to warm to room temperature. At this temperature the mixture is let stand for 2 days. The pressure is then released and the solvent removed from the polymer by evaporation. Without further treatment this polymer is molded at 165–175° C. in standard molding equipment. Incorporation of about 5 per cent of a suitable plasticizer such as the dimethyl ether of tetraethylene glycol improves the flowability of the product during molding.

*Example III*

One hundred (100) parts of anhydrous formaldehyde is distilled into a cooled pressure vessel containing 400 parts of methylene chloride, 10 parts of pentanoyl-n-propylethenone and 1 part of hexamethylene diisocyanate. The formaldehyde is polymerized in the manner described in Example II.

The resultant polymer melts in the 165–175° C. range. It shows a greater thermal stability than formaldehyde polymers prepared in the absence of isocyanates and aliphatic acylethenone, decomposing only slowly even up to 200° C., whereas formaldehyde polymers prepared similarly but without the acylethenone or acylalkylethenone and isocyanate decompose rapidly even at temperatures as low as 175° C. Molding yields a softer, more flexible, less brittle product than the unmodified polymer.

In the polymerization process, any inert solvent or mixture of inert solvents may be used. Mixtures of solvents are of particular value in those cases where the pure solvents would freeze at the temperature employed for condensing the formaldehyde. Suitable solvents include ethers such as dimethyl, diethyl, diisopropyl, etc. and aliphatic and aromatic hydrocarbons, generally best used in combination with other solvents because of the limited solvent action on formaldehyde of the aliphatic hydrocarbon, and the comparatively high melting point of the aromatic hydrocarbons. Because of its good solvent action, inertness, low freezing point, and low melting point, methylene chloride is well suited as a medium for the polymerization. However, many other halogenated hydrocarbons, such as methyl chloride, chloroform, carbon tetrachloride, trichloroethylene, tetrachloroethylene, dichloroethane, and chlorobenzene are useful, particularly in a combination of two or more solvents.

Any aliphatic acylethenone including acylalkylethenone may be employed as the modifying agent for the polymer. Thus the acetyl, propionyl, butanoyl, pentanoyl and higher acyl derivatives of ethenone together with their alkyl derivatives all are suitable. These compounds, particularly the higher ones, may be obtained by the action of tertiary aliphatic amines upon the appropriate acyl chloride or mixture of chlorides according to the processes of Sauer Serial No. 234,843 and Serial No. 234,844, filed October 13, 1938. Specific examples of aliphatic acylethenones are acetylethenone, dodecanoylethenone, propanoylmethylethenone, butanoylethylethenone, pentanoylpropylethenone, octanoylhexylethenone, and dodecanoyldecylethenone.

In the process of this invention, any organic isocyanate or isothiocyanate may be used including the aliphatic monoisocyanates or isothiocyanates, e. g., methyl, ethyl, propyl, butyl, amyl, hexyl, heptyl, decyl, dodecyl, and octadecyl isocyanates and isothiocyanates. Polyisocyanates and polyisothiocyanates, e. g., tetramethylene diisocyanate and hexamethylene diisocyanate and diisothiocyanate, the aromatic and alicyclic mono- and polyisocyanates, e. g., phenyl, naphthyl and cyclohexyl isocyanates and isothiocyanates, as well as phenylene, naphthylene, and cyclohexylene diisocyanates and diisothiocyanates may be employed.

Often it is convenient to pass the anhydrous formaldehyde gas directly into a cooled solution of the acylethenone and isocyanate. However, the reactants and solvent may be added to the reaction vessel in any desired order; for example, the acylethenone and isocyanate may be added to the cooled formaldehyde solution, or the three reactants may be added simultaneously to the solvent. In place of formaldehyde gas, anhydrous liquid formaldehyde may be mixed with the other reactants. It is important that the materials be well mixed at a lower temperature, e. g., —20° C. before warming to the desired temperature of polymerization, e. g., —20° to +30° C. Agitation may be used effectively also throughout the polymerization to insure a homogeneous product.

The formation of the polymers is carried out at pressures equal to or greater than the vapor pressure of the formaldehyde under the conditions of the reaction. As the formaldehyde is best conducted into the reaction mixture in a stream of inert gas (for example, nitrogen), it may be most convenient to effect this by simply sealing the vessel and allowing the formaldehyde to polymerize under the pressure of the entrapped gas. Any desired excess inert gas pressure may be applied to the polymerization vessel; it is important that moisture and other reactive vapors be excluded. On the other hand, gas pressure is not needed, and the polymerizing medium may completely fill the pressure vessel employed.

Polymerization is best carried out in the temperature range between —20 and +30° C. Below these temperatures reaction is slow, and less plastic, higher molecular weight polymers tend to form. These products are molded with more difficulty because of their narrower molding range; they yield harder but more brittle moldings. Above these temperatures reaction is more rapid; and less stable, lower molecular weight polymers tend to result. These products are molded with more difficulty because of their poorer stability at molding temperatures; they yield weaker, less durable moldings. The preferred polymerization temperatures is in the 0 to 20° C. range. At this temperature reaction is essentially complete after 24 hours. The products formed show good stability and are molded readily to hard, tough articles of good appearance and durability.

The product may be molded directly following the removal of the solvent or solvents employed in its preparation. However, it is often desirable first to treat the polymer with one or more extraction solvents to remove small amounts of formaldehyde and lower formaldehyde polymers. Methyl alcohol and acetone are particularly useful organic solvents which may be employed. However, any solvent which is a non-solvent for the polymer but a solvent for formaldehyde and its lower polymers including alcohols, ketones, ethers, esters, hydrocarbons, and halogenated hydrocarbons is suitable. Formaldehyde acceptors such as dilute aqueous ammonia, aqueous formamide, and dilute aqueous solutions of strong alkalies are useful, particularly in removing small amounts of polymers of the paraformaldehyde type which may be present.

Plasticizers may be added to the polymer to improve its molding characteristics and in certain instances to improve the appearance of the resultant molding. Such materials include dimethyl ether of tetraethylene glycol, β-phenoxy ethanol, dicresyl ether of diethylene glycol, tetraethylene glycol, polyethylene oxide, beta-hydroxyethyl-o-methoxybenzamide, dimethoxyethyl phthalate, dibutyl phthalate, triethylene glycol dihexoate, the cyclohexanone ketal of glycerol, and many others.

In addition to these plasticizers, there may be employed in the solid polymer formaldehyde acceptors such as phenols, cresols, resorcinol, 1,12-diphenyloloctadecane, amides, urea, casein, starch, and many other materials known to be reactive with formaldehyde. These tend to react with the small amounts of formaldehyde liberated from the lower molecular weight ingredients of the polymer during molding, thereby giving increased strength to the resultant moldings.

At times it is desirable to modify the properties of the polymer prior to molding by reaction with materials capable of condensation with hydroxyl end groups which may be present on the polymer. Such materials include esterification and etherification reagents such as acid anhydrides and alkyl sulfates.

The polymer may be intermolded with a variety of other adjuvants of use as fillers, pigments, and stabilizers. These include wood and cork flour, mineral fillers and pigments, and various natural and artificial polymers. The incorporation of such materials is useful in enhancing the hardness, toughness, softness, flexibility, stability, and color of the molded articles.

This invention is useful for the preparation of modified, high molecular weight, plastic formaldehyde polymers. These polymers are especially useful in the production of molded articles having good strength, hardness, heat-resistance, and color. They are also attractive from the standpoint of cost. More particularly these polymers are useful for the preparation of molded articles such as buttons, combs, toilet articles, drinking glasses, kitchenware, bottle caps, pens and pencils, cigarette cases, handles of various types, ornamental knobs and panels, insulating materials, especially when filled with mica, clay, etc., and many others.

The above description and examples are intended to be illustrative only. Any modification of or variation therefrom which conforms to the spirit of the invention is intended to be included within the scope of the claims.

What is claimed is:

1. A high molecular weight plastic polymer of formaldehyde with 0.05 to 5.0 mol per cent, based on formaldehyde, of a wholly aliphatic acylethenone, and 0.01 to 2.0 mol per cent, based on formaldehyde, of an unsubstituted organic isocyanate.

2. A high molecular weight plastic polymer of formaldehyde with 0.05 to 5.0 mol per cent, based on formaldehyde, of a wholly aliphatic acyl alkyl ethenone and 0.01 to 2.0 mol per cent, based on formaldehyde, of an unsubstituted organic isocyanate.

3. A high molecular weight plastic polymer of formaldehyde with 0.05 to 5.0 mol per cent, based on formaldehyde, of an aliphatic acyl alkyl ethenone, and 0.01 to 2.0 mol per cent based on formaldehyde of an aliphatic isocyanate.

4. A polymer of formaldehyde with 0.05 to 5.0 mol per cent, based on formaldehyde, of a wholly aliphatic acyl ethenone and 0.01 to 2.0 mol per cent, based on formaldehyde, of an aliphatic diisocyanate.

5. A polymer of formaldehyde with 0.05 to 5.0 mol per cent, based on formaldehyde, of a wholly aliphatic acylethenone and 0.01 to 2.0 mol per cent, based on formaldehyde, of hexamethylene diisocyanate.

6. A polymer of formaldehyde with 0.05 to 5.0 mol per cent, based on formaldehyde, of octanoyl-n-hexylethenone and 0.01 to 2.0 mol per cent, based on formaldehyde, of an unsubstituted organic isocyanate.

7. A polymer of formaldehyde with 0.05 to 5.0 mol per cent, based on formaldehyde, of octanoyl-n-hexylethenone and 0.01 to 2.0 mol per cent, based on formaldehyde, of hexamethylene diisocyanate.

8. Process which comprises reacting formaldehyde with 0.05 to 5.0 mol per cent of a wholly aliphatic acylethenone, and 0.01 to 2.0 mol per cent, based on formaldehyde, of an unsubstituted organic isocyanate.

9. Process which comprises reacting formaldehyde with 0.05 to 5.0 mol per cent, based on formaldehyde, of a wholly aliphatic acyl alkyl ethenone and 0.01 to 2.0 mol per cent, based on formaldehyde, of an unsubstituted organic isocyanate.

10. Process which comprises reacting in an inert solvent formaldehyde with 0.05 to 5.0 mol per cent of a wholly aliphatic acylethenone and 0.01 to 2.0 mol per cent, based on formaldehyde, of an unsubstituted organic isocyanate at a temperature of −20 to +30° C. and a pressure at least equal to the vapor pressure of formaldehyde under the polymerization conditions.

11. Process which comprises reacting formaldehyde in an inert solvent at a temperature of −20 to +30° C. and a pressure at least equal to vapor pressure of formaldehyde under the polymerization conditions with 0.05 to 5.0 mol per cent of an aliphatic acyl alkyl ethenone and 0.01 to 2.0 mol per cent of an unsubstituted organic isocyanate.

12. Process which comprises reacting formaldehyde in an inert solvent at a temperature of −20 to +30° C. and a pressure at least equal to vapor pressure of formaldehyde under the polymerization conditions with 0.05 to 5.0 mol per cent of an aliphatic acyl alkyl ethenone and 0.01 to 2.0 mol per cent of an aliphatic isocyanate.

13. Process which comprises reacting formaldehyde in an inert solvent at a temperature of −20 to +30° C. and a pressure at least equal to vapor pressure of formaldehyde under the polymerization conditions with 0.05 to 5.0 mol per cent of octanoyl-n-hexylethenone and 0.01 to 2.0 mol per cent of an aliphatic diisocyanate.

14. Process which comprises reacting formaldehyde in an inert solvent at a temperature of −20 to +30° C. and a pressure at least equal to vapor pressure of formaldehyde under the polymerization conditions with 0.05 to 5.0 mol per cent of octanoyl-n-hexylethenone and 0.01 to 2.0 mol per cent of hexamethylene diisocyanate.

15. A high molecular weight plastic polymer of formaldehyde with 0.05 to 5.0 mol per cent, based on formaldehyde, of a wholly aliphatic acyl ethenone and 0.01 to 2.0 mol per cent, based on formaldehyde, of an organic isocyanate of the formula $R(NCO)_x$ wherein $x$ is an integer not more than two and R is hydrocarbon.

16. A polymer of formaldehyde with 0.05 to 5.0 mol per cent, based on formaldehyde, of octanoyl-n-hexylethenone and 0.01 to 2.0 mol per cent, based on formaldehyde, of an organic isocyanate of the formula $R(NCO)_x$ wherein $x$ is an integer not more than two and R is hydrocarbon.

17. Process which comprises reacting formaldehyde with 0.05 to 5.0 mol per cent, based on formaldehyde, of a wholly aliphatic acylethenone and 0.01 to 2.0 mol per cent, based on formaldehyde, of an organic isocyanate of the formula $R(NCO)_x$ wherein $x$ is an integer not more than two and R is hydrocarbon.

PAUL ROLLAND AUSTIN.
CHARLES EDWARD FRANK.